Figure 1:
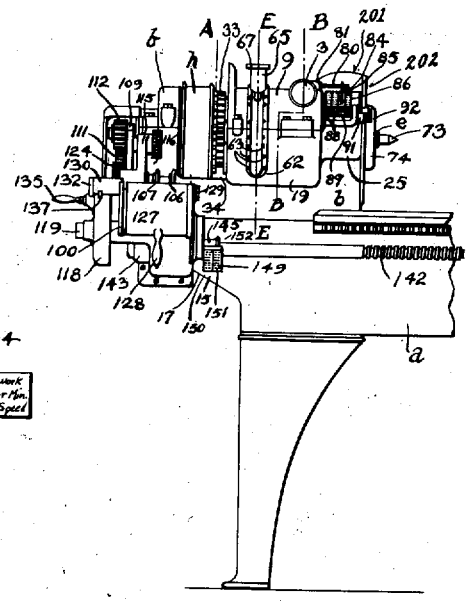

W. L. SCHELLENBACH.

GEARING.

APPLICATION FILED MAY 3, 1911.

Reissued Apr. 29, 1913.

13,560.

5 SHEETS—SHEET 1.

Witnesses

K. Thornton Bogert

C. R. Kropf

Inventor

William L. Schellenbach

By C. W. Miles.

Attorney

W. L. SCHELLENBACH.

GEARING.

APPLICATION FILED MAY 3, 1911.

Reissued Apr. 29, 1913.

13,560.

5 SHEETS—SHEET 2.

Witnesses

W. Thornton Bogert

B. R. Kropf

Inventor

William L. Schellenbach

By C. W. Miller

Attorney

W. L. SCHELLENBACH.

GEARING.

APPLICATION FILED MAY 3, 1911.

Reissued Apr. 29, 1913.

13,560.

5 SHEETS—SHEET 3.

Witnesses

W. Thornton Bogert

C. R. Kropff

Inventor

William L. Schellenbach

By C. W. Miles

Attorney

W. L. SCHELLENBACH.

GEARING.

APPLICATION FILED MAY 3, 1911.

Reissued Apr. 29, 1913.

13,560.

5 SHEETS—SHEET 4.

Witnesses

W. Thornton Bogert

C. R. Kropff

Inventor

William L. Schellenbach

By C. W. Miles.

Attorney

W. L. SCHELLENBACH.
GEARING.
APPLICATION FILED MAY 3, 1911.
Reissued Apr. 29, 1913.
13,560.
5 SHEETS—SHEET 5.
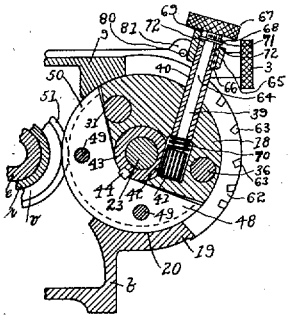
Fig. 9
| Thread | Driver | Change Gear | Thread | Driver | Change Gear. |
|---|---|---|---|---|---|
| 2 | 64 | 16 | 16 | 64 | 16 |
| 2¼ | " | 18 | 18 | " | 18 |
| 2½ | " | 20 | 20 | " | 20 |
| 2¾ | " | 22 | 22 | " | 22 |
| 2⅞ | " | 23 | 23 | " | 23 |
| 3 | " | 24 | 24 | " | 24 |
| 3¼ | " | 26 | 26 | " | 26 |
| 3½ | " | 28 | 28 | " | 28 |
| 4 | 32 | 16 | 32 | 32 | 16 |
| 4½ | " | 18 | 36 | " | 18 |
| 5 | " | 20 | 40 | " | 20 |
| 5½ | " | 22 | 44 | " | 22 |
| 5¾ | " | 23 | 46 | " | 23 |
| 6 | " | 24 | 48 | " | 24 |
| 6½ | " | 26 | 52 | " | 26 |
| 8 | 16 | 16 | 64 | 16 | 16 |
| 9 | " | 18 | 72 | " | 18 |
| 10 | " | 20 | 80 | " | 20 |
| 11 | " | 22 | 88 | " | 22 |
| 11½ | " | 23 | 92 | " | 23 |
| 12 | " | 24 | 96 | " | 24 |
| 13 | " | 26 | 104 | " | 26 |
| 14 | " | 28 | 112 | " | 28 |
150 151
149
Fig. 14
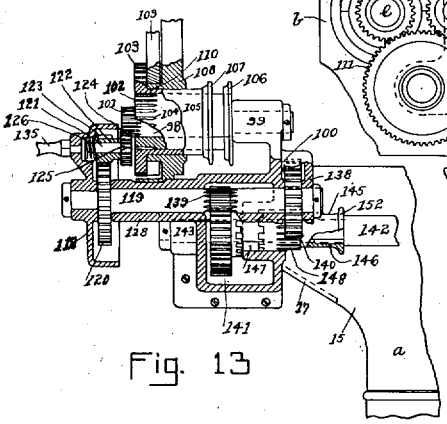
Fig. 13
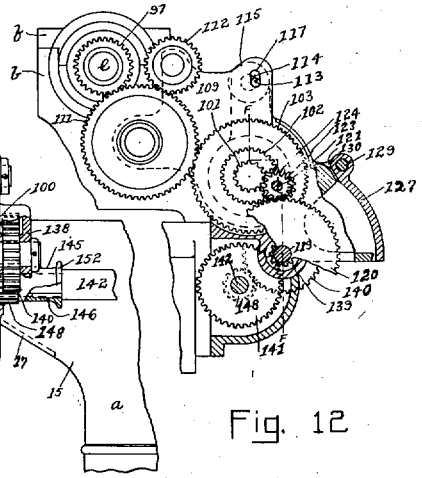
Fig. 12
Witnesses
W. Thornton Bogert
C. R. Wroff
Inventor
William L. Schellenbach
By C. W. Miles.
Attorney

UNITED STATES PATENT OFFICE.

WILLIAM L. SCHELLENBACH, OF HARTWELL, OHIO.

GEARING.

13,560. Specification of Reissued Letters Patent. Reissued Apr. 29, 1913.

Original application filed August 3, 1906, Serial No. 329,029. Renewed October 3, 1908, Serial No. 456,057. Original No. 920,664, dated May 4, 1909. Application for reissue filed May 3, 1911. Serial No. 624,877.

*To all whom it may concern:*

Be it known that I, WILLIAM L. SCHELLENBACH, residing at Hartwell, in the county of Hamilton and State of Ohio, and a citizen of the United States, have invented certain new and useful Improvements in Gearing, of which the following is a specification.

My invention relates to improvements in gearing and consists in the providing of new and improved means whereby the spindle may be given various speeds by novel means selectively acting upon the spindle or the bull-wheel having connection with the spindle; in providing means whereby various speeds may be imparted in novel manner to the spindle from a prime mover through gearing intermediately acting on the bull-wheel secured to the spindle outside the spindle bearings; in providing means for changing the speed of the spindle comprising gears rotatable about and slidable longitudinally of the rotary axis of the spindle; in providing a system of gears rotating about and slidable longitudinally of the spindle, with a speed-barrel having gearing arranged to selectively mesh with said sliding gears; in providing said speed barrel with gearing whose rotary axis is coincident with the working axis of said barrel meshing with gearing whose rotary axis is coincident with the rotary axis of the spindle for imparting selective speeds to the bull-wheel; further in providing novel shifting mechanism on said barrel for selectively imparting speeds direct to the spindle or through the medium of said barrel gearing to the bull-wheel thereof; further in transferring such selective speeds to the lead-screw or feed-rod; and further in the parts, and in the construction, arrangement and combinations of parts hereinafter more fully described and claimed.

Figure 11:
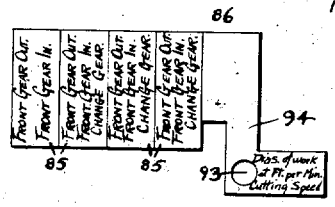
Figure 11:
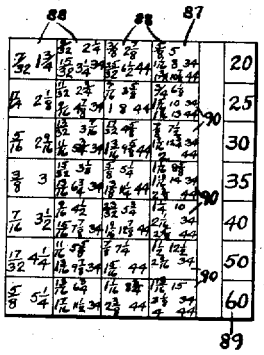
Figure 10:
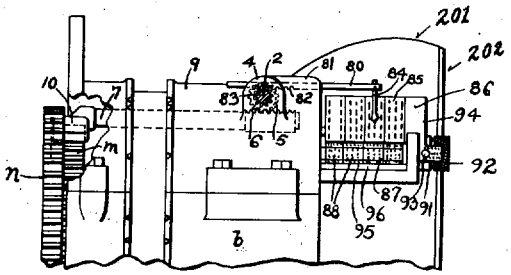
Figure 3:
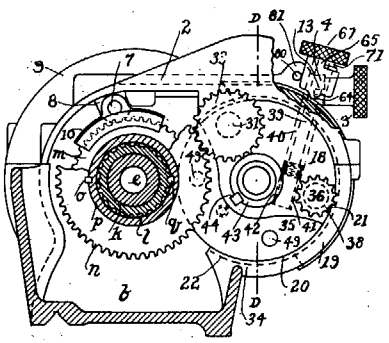
Figure 4:
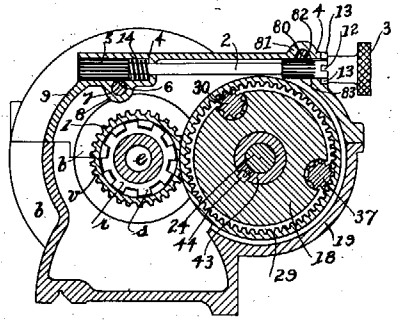
Figure 2:
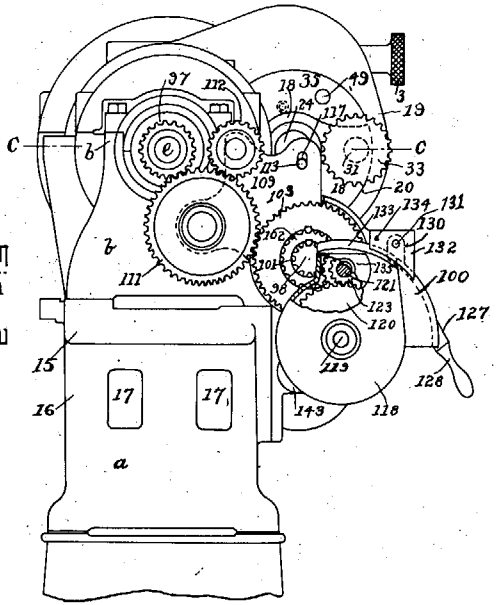
Figure 5:
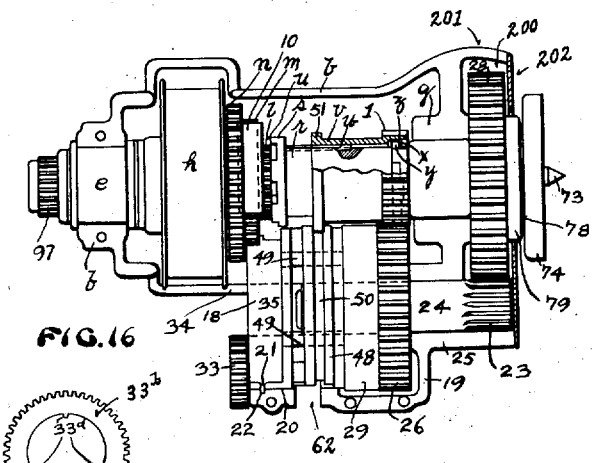
Figure 15:
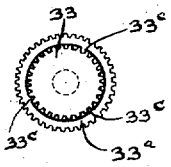
Figure 16:
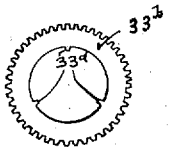
Figure 6:
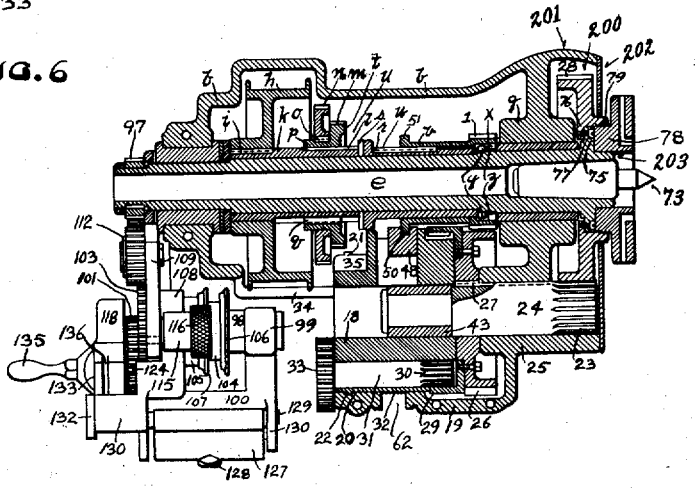
Figure 8:
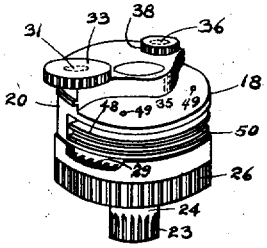
Figure 7:
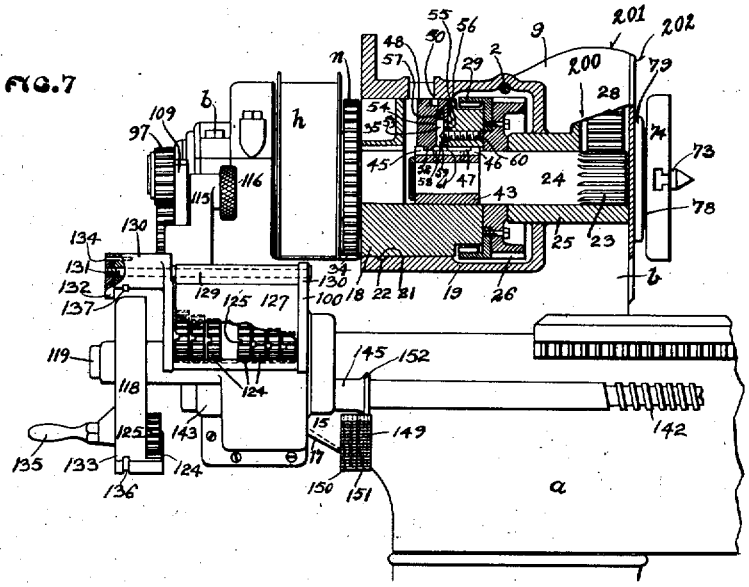

In the drawings: Figure 1 is a front elevation of my improved device. Fig. 2 is an end elevation of the same partly broken away, but with the speed-barrel turned for disengaging its tumbler-pinions. Fig. 3 is a cross-section of the head-stock on the line A of Fig. 1, and partly broken away to show the speed-controlling handles, the tumbler-pinion being in engaged relation. Fig. 4 is a cross-section of the same on the line B—B of Fig. 1. Fig. 5 is a plan view of the head-stock with the cap of the head-stock removed and the speed-barrel turned for disengaging its tumbler-pinions. Fig. 6 is a horizontal section of the same on the line C—C of Fig. 2. Fig. 7 is a front elevation of the head end of the lathe, partly broken away, and partly showing the speed-barrel and its support in section on line D—D of Fig. 3. Fig. 8 is a perspective view of the speed-barrel, partly broken away. Fig. 9 is a detail of the speed-barrel and its connections in cross-section on the line E—E of Fig. 1. Fig. 10 is a front elevation of the head-stock partly broken away showing the speed gage connections. Fig. 11 is a plan view of the speed gage laid out in plane. Fig. 12 is an enlarged end elevation partly broken away showing the gearing between the spindle and lead-screw. Fig. 13 is a front elevation of the same partly broken away and partly in irregular section on the line F—F of Fig. 12. Fig. 14 is a front elevation of the feed gage for the lead-screw. Fig. 15 is a side elevation showing the manner of mounting the change-gears; and Fig. 16 is a side elevation of one of the change-gears.

*a* represents the lathe-bed or shears, *b* the head-stock, *c* the carriage, and *d* the tail-stock.

*e* is a spindle which is journaled in bearings *f g* in the head-stock.

*h* is a prime mover, shown as a pulley, although it is obvious that this may also be a gear driven for instance from an electric motor or other actuating device.

In my improved device various speeds are transmitted to the spindle from the prime mover, either by connection with said spindle direct from the prime mover or through gearing, or through the medium of gearing transmitting motion at various speeds to the bull-wheel adjacent the head-center and face-plate, various speeds of longitudinal movement being also transmitted to the carriage and cross-slide on the carriage for imparting proper relative speed of rotation to the work and of travel to the tool. The various means which I employ for the purpose will now be described.

The pulley *h* is secured, as by a key *i* to a sleeve *k* journaled about the spindle. A gear *l* is formed on or carried by the sleeve and is rigid therewith. Gears *m n* slide longitudinally of the sleeve and rotate together with the sleeve, as see the key *o* between the gear $n$ and the hub $p$ of the gear $m$, and the spline $q$ between said hub and the sleeve. $r$ is a second sleeve journaled on the spindle, the said sleeves $k$ and $r$ being respectively located end for end, or longitudinally of the spindle. The sleeve $r$ at its end adjacent the sleeve $k$ has a clutch-face $s$ with which a clutch-face $t$ on the gear $m$ is adapted to make engagement for forming a clutch $u$ between said sleeves for causing said sleeves to rotate together at the speed of the prime mover. A telescoping sleeve $v$ takes about the sleeve $r$ and slides longitudinally thereof and has spline connection $w$ with the same. At its inner end it carries clutch teeth $x$ adapted to make engagement with the clutch teeth $y$ on the spindle for forming a clutch $z$ between said telescoping sleeve and spindle for causing said spindle to move with said telescoping sleeve when said clutch $z$ is clutched, and securing the spindle to rotate at the speed of the prime mover when the clutches $u$ $z$ are in engagement. This telescoping sleeve also has formed thereon or rigid therewith a gear numbered 1.

For shifting the gears $m$ $n$ and causing engagement of the clutch $u$, I provide a shifting-shaft 2 having a handle 3 and journaled in bearings 4 and carrying a pinion 5. The pinion 5 meshes with a rack 6 on a shifting rod 7 sliding in bearings 8 on the cap 9 of the head-stock. The rod 7 carries a fork 10, the tines of which take to either side of the gear $m$ at its periphery, one of said tines being received by an annular groove in the gear $n$. The shaft 2 slides longitudinally in its bearings, its handle 3 having positioning lugs 12 adapted to selectively engage positioning notches 13 in the outer bearing 4 for positioning said gears $m$ $n$ in desired location lengthwise of the sleeve $i$, there being four of these selective positions in the form shown, one for engaging the clutch $u$ and one for each of the gears. A spring 14 causes normal engagement between said positioning lugs and notches. It will be noticed that the bed has an over-hanging head-end 15 and that the pulley $h$ is located above this overhanging end. The bottom wall 16 of the overhanging end is provided with openings 17 to accommodate a belt which may pass through said openings over said pulley and be driven from a motor attached to the legs of the machine.

18 is a gear-barrel or tumbler. It rocks in the projection 19 of the head-stock in which it has bearing, the journal face 20 of said barrel being preferably at its periphery. In order to prevent longitudinal movement of said barrel, it is provided with a segmental lug 21 received by a segmental groove 22 in the protrusion or bearing 19. A pinion 23 is integral with or secured to a shaft 24 journaled in a bearing 25 in which it is longitudinally slidable. The rotary axis of this shaft is coincident with the rocking axis of the tumbler. A gear 26 meshes with the gear numbered 1 and has spline-connection 27 with the shaft 24 for transmitting motion from said gear numbered 1 to the pinion 23, the latter being arranged to mesh with the bull-wheel 28. An internal gear 29 is secured rigidly with relation to the gear 26. A pinion 30 meshes with the internal gear. It is mounted on a shaft 31 journaled in a bearing 32 in the tumbler and at its outer end carries a gear 33 adapted to selectively mesh with the gears lettered $l$, $m$ or $n$ through a slot 34 in the head-stock. The gear 33 is shown as an overhanging gear and is preferably one of a series of change-gears. I prefer to provide the change of gears by making the gear 33 the smallest of the series of change-gears and forming it as part of the shaft 31. The change-gears of larger diameter of which there are preferably two, as shown at $33^a$ and $33^b$, (see Figs. 15 and 16), are arranged to telescope the gear 33 and respectively have internal teeth $33^c$ and $33^d$ arranged to engage the teeth of the gear 33 for causing rotation with the latter. The speed-barrel has a recess 35 at its head-end for accommodating the slipping gears $m$ $n$. If desired the tumbler may be provided with a second shaft 36 having a gear 37 meshing with the internal gear 29, and a gear 38, which may be one of a second series of change-gears similar to the change-gears 33, $33^a$ and $33^b$, and which may be mounted similarly to said last-named change-gears 33, $33^a$ and $33^b$, and adapted to mesh with the respective gears lettered $l$, $m$ and $n$.

In order to cause transmission to be effected selectively through the clutch $z$ or the pinion 23 to the spindle, I provide a rock-shaft 39 journaled in a bearing 40 in the tumbler and having a pinion 41 meshing with a rack 42 on a collar 43 secured against longitudinal movement to the shaft 24 and having spline-connection 44 with the tumbler. (See Figs. 7 and 9.) The collar 43 has shifting lugs 45 46 forming contact-faces having a shifting space 47 between the same. A block 48 rides on rods 49 in the barrel and has a groove 50, (see Figs. 5, 6 and 8), the walls of which engage with an annular flange 51 on the telescoping sleeve $v$. This block has a lug 52 forming a contact-part adapted to be engaged by the lugs 45 46 for shifting the block and consequently the telescoping sleeve for engaging the clutch $z$, the shifting of said block also causing longitudinal shifting of the pinion 23. It is desirable however that said clutch and pinion shall not be simultaneously engaged. In order to prevent this, I provide the block with a latch 53 slidable longitudinally in a recess 54 in the block and having a pin 55 slidable in a groove 56 in said block for preventing turning of the latch. A spring 57 backs the latch. The latch has an engaging lug 58 having an inclined face 59 adapted to be engaged by the lug 46 for raising the latch and permitting said lug to pass said latch when the collar 43 is shifted in one direction, the said lug engaging said latch for shifting said block when said collar is moved in the other direction. Thus when the collar is shifted for disengaging the pinion 23 and engaging the clutch *z*, the shifting of the collar will first cause disengagement of said pinion from the bull-wheel owing to the shifting space 47 between the lugs 45 46. Prior to the shifting of said block 48, the lug 46 will engage the inclined face 59 of the latch 53, thus raising the latch. The latch being raised and the lug 46 continuing its movement, the said lug will next engage the lug 52 on the block, the further movement of said collar causing shifting of said block. Prior to the shifting of said block however, the pinion 23 will have been shifted longitudinally sufficient to disengage it from the bull-wheel. The block now being shifted will cause longitudinal movement of the telescoping sleeve, thereby causing engagement of the clutch *z*. In the meantime the latch 53 will have been retracted by the spring 57, its lug 58 taking in rear of the shifting lug 46, which latter is now located between said latch and the lug on the block. If it is now desired to re-engage the pinion 23, the collar 43 being shifted in the opposite direction will cause opposite shifting of said block. When said block has been thus oppositely shifted a distance sufficient to disengage the clutch *z*, a pin 60 secured in a recess in the tumbler will make engagement with the latch for raising the same out of range of the lug 46. I accomplish this raising by providing the pin with an inclined face arranged to make engagement with the inclined wall of a recess 61 in the latch. The lug 46 being disengaged, and the clutch *z* released, the shifting of the collar 43 is continued for causing engagement between the pinion 23 and the bull-wheel.

For rocking the tumbler, I employ the rock-shaft 39 which therefore acts as a gear-shifting and tumbler-rocking shaft. This shaft or lever is shiftable at right angles to the rocking axis of the tumbler in a slot 62 formed in the face of the projection 19. The adjacent walls of said slot, which is shown arc-shaped, are provided with recesses 63 with which the lugs 64 on a sleeve 65 are adapted to engage for positioning the tumbler radially and causing proper engagement between the change-gears at the outer end of the tumbler and the gears taking about the spindle. The sleeve 65 has spline connection 66 with the tube which forms the bearing 40, the tube being stationary in the speed-barrel. 67 is a shifting-handle which has an annular groove 68 into which a lug 69 on the sleeve 65 takes. The shaft 39 is permitted slight longitudinal movement in its bearing tube, and a spring 70 is interposed between its bearing and pinion for normally causing engagement between said sleeve-lugs and recesses, thereby locking the speed-barrel in rocked position. The handle has a pin 71 adapted to selectively engage holes 72 in the outer end of the bearing-tube for locking the shaft 39 in rocked position when either the clutch *z* or the pinion 23 is in engaged position.

The power is transmitted to the spindle at points adjacent the head-center 73 or face-plate 74 thereby relieving the spindle of torsional strain. Thus the inner end of the spindle is provided with a flange 75. The bull-wheel at the inner end of the spindle has a flange 76 which is secured to the flange 75 by means of bolts 77, the flange 76 being outside the flange 75. The face-plate 74 has a threaded hub 78 which screws into the threaded socket 79 of the bull-wheel, the threads being arranged in such manner that the force of the tool against the work will tend to screw up the face-plate. The greater the force applied therefore, the firmer will be the engagement between said flanges, and the firmer will the bull-wheel be locked to the face-plate. The power applied is transmitted to the bull-wheel from its periphery from a source which has no driving connection with the spindle, thereby relieving the spindle of all torsional strain. It will be further noticed that the clutch *z* is located immediately adjacent to the inner bearing of the spindle closely adjacent the bull-wheel and head center, and that it too has the power transmitted to it from a source which has no further driving connection with the spindle, thus relieving the spindle of torsional strain.

The bull-wheel 28 is seated in a recess 200 formed by a projection 201 from the frame *b* forward of the spindle bearing *g*, and a detachable housing plate 202, which fits closely to the hub 79 of the bull-wheel to protect said bull-wheel from chips and dirt from the work and the operator from injury by contact with said bull-wheel. The forward end of the live spindle projects forward of the hub or socket 79 of the bull-wheel and is externally cylindrical to constitute a pilot 203, which serves as a guide and pivotal support for work-holding members, such as the face-plate 74, Figs. 5 and 6, during the act of engaging and disengaging such work-holding members with the bull-wheel hub 79, a variety of work-holding members, some of which are very heavy and difficult to handle, being adapted to be interchangeably employed.

For work of large diameter, and where heavy cuts are to be made, involving the transmission of heavy strains from the driving mechanism to the work, power is preferably transmitted from the prime mover through the bull-wheel to the work holder, in which case it will be noted that direct torsional strain is not put upon the live spindle, but that such strain is transmitted through parts of large area directly from the bull-wheel to the work-holding member, and with no section of the spindle and no spindle bearing interposed between said bull-wheel and work-holding member. Where higher spindle speeds and lighter cuts are required and comparatively little torsional strain would be put upon the live spindle, power is preferably transmitted from the prime mover to the spindle at a point intermediate of the spindle bearings.

Power is transmitted to the spindle from the prime mover through the sleeves taking thereabout and the clutch *z*, the said sleeves being clutched together for imparting the speed of said prime mover to the spindle; or the clutch between the sleeves may be disengaged and the power transmitted through the gears lettered *l m* or *n*, the selective gears 33, 38, the gears 29 and 26, the gear numbered 1, and the clutch *z* between said latter gear and the spindle; or the clutch *z* may be released and the pinion 23 engaged with the bull-wheel for transmitting all of the speeds of said internal gear 29 to the spindle at different ratios, thereby providing a great number of spindle speeds, which is a great desideratum in lathe construction because the diameters of work operated on in a lathe vary greatly, the materials of which the work is composed also varying greatly, and it being understood that for greatest efficiency and best product, the proper relation of cutting speed and material of which the work is composed should be maintained, having due regard also to depth of cut being taken at the time. Thus it has been ascertained that cast iron may be turned with greatest efficiency at a given circumferential speed, cast steel at another circumferential speed, and cold-rolled steel, machinery steel and other materials at still other speeds, and in order to maintain these proper relations for greatest efficiency and further for relieving the spindle of torsional strain, my improved device is exceptionally useful.

In order to attain the requisite spindle-speed in convenient manner and for guiding an inexperienced operator as to the proper gearing to be employed for attaining various circumferential speeds at given diameters of work, I provide a speed-gage which will now be described. In describing this feature I shall assume an exemplification of my device in which sixteen different speeds may be imparted to the spindle from the prime mover. These are obtained firstly, through the gears taking about the spindle at the prime mover and the clutch between the spindle sleeves; secondly, through the tumbler pinion 33 and two change-gears taking thereabout, and thirdly, through the clutch *z* and bull-wheel pinion, the first of these imparting four different speeds to the spindle, the resultants of the second multiplying these speeds by two, giving eight, and the third, multiplying these resultants again by two, resulting in sixteen different spindle-speeds.

80 is a gage-rod which has sliding connection in a bearing 81 of the head-stock. A rack 82 is on the gage-rod and is meshed by a pinion 83 on the shifting-shaft 2. (See Figs. 1, 4, 10 and 11.) A finger 84 is mounted on the gage-rod and selectively points to the columns 85 of a gage-plate 86 having guiding notations thereon. Placing the finger opposite a given column affects the position of the sliding gears or clutch located about the spindle at the prime mover. There is operative connection as already described between said shifting-shaft 2 and said longitudinally slidable gears taking about the spindle.

87 is an annular gage having columns 88, these columns registering with the columns 85. These columns of the annular gage comprise notations of the diameters of work and of gearing desirable for turning such diameters. The annular gage also has a column 89 of desirable circumferential speeds. Opposite the respective speeds noted in this speed-column, the columns 88, which may be termed the primary columns, are arranged into transverse or secondary columns 90 which contain notations of diameters and gearing adaptable for the given speeds. The construction forms a speed-changing guide, comprising an index-member and an indicator-member therefor, having connection with the speed-changing mechanism for affecting the relation of the parts in the latter.

Referring to Fig. 11 in which the gages 86, 87 are laid out in plane, it will be noted that the notations on the gage 86 are "Front gear out," "Front in," and "Change gear." The term "front gear out" denotes that the bull-wheel pinion is out of mesh with the bull-wheel, and the clutch *z* is in engagement. "Front gear in" denotes that the clutch is out of engagement, and the bull-wheel pinion in mesh with the bull-wheel. The notation "34" under the term "Change gear" denotes that the change gear (33) having 34 teeth, is upon the tumbler-pinion shaft for acting as the tumbler-pinion adapted to mesh with the selective gears taking about the spindle at the prime mover position. The notation "44" denotes that the change gear (33) having 44 teeth, is acting as the tumbler-pinion, and the blanks under the term "Change gear" denote that the usual change gear 33 is intended to be used. Illustrating the use of the speed gage, it will be assumed that a piece of work is placed in the lathe for turning the same, and that such work is of such material or character that it is desirable to turn it at a peripheral speed of twenty feet per minute, and that it is five inches in diameter. The gage 87 which is on a shaft journaled in a bearing 91, is then turned by the handle 92 until the numeral 20 appears through the aperture 93 of the shield 94 shown as a part of the gage-plate 86. The secondary column 90 opposite the numeral 20 will then show through the opening 95 of the cover 96. The figure 5 is shown in the fourth primary column of the secondary column thus exposed. The shifting-shaft 2 is then turned to bring the finger 84 opposite the fourth column, in which the figure 5 appears. This in turn will shift the gears taking about the spindle at the position of the prime mover, shifting the sliding gears to their extreme position to the left and bringing the larger of the gears sliding upon the spindle at the prime mover position within the pulley and exposing the smallest gear opposite the tumbler-pinion, the space under the term "Change gear" being blank indicating that the ordinary tumbler-pinion 33 is to be engaged with said smallest gear. The figure 5 appearing under the term "Front gear in" indicates that the bull-wheel pinion is to be in mesh with the bull-wheel. When these connections are so made, the piece of work of five inches diameter will be rotated at a peripheral speed of 20 feet per minute.

For operating the lead-screw which, in the form shown, also acts as the feed-rod, I employ the following instrumentalities. (See Figs. 1, 2, 7, 12 and 13). A gear 97 is secured to the spindle. 98 is a telescoping gear-shaft journaled in a bearing 99 of a gear-box 100. A gear 101 is integral with or secured to said shaft 98. Gears 102 103 telescope about said gear 101 and are shown on sleeves 104 105 telescoping one upon the other and about said shaft 98 and provided respectively with shifting collars 106 107. The sleeve 105 is journaled in a bearing 108 of the gear-box. The telescoping gears have spline-connection with each other. A tumbler-plate 109 rocks on a stud 110 about the rotary axis of said telescoping gears and carries gears 111 112 either of which is adapted to selectively engage gear 97 for imparting forward or reverse motion to the lead screw dependent on which of said gears is in mesh with the spindle-gear. The tumbler-plate is rocked by means of a crank-pin 113 on a crank-shaft 114, journaled in bearings 115 and operated by a handle 116. The crank-pin works in a slot 117 in the tumbler-plate for shifting the latter. The gear 103 meshes with the gear 111, which latter is sufficiently wide that gear 103 may not be shifted out of range therewith. 118 is a rocker-plate rocking on a shaft 119 which latter has a gear 120 secured thereto. 121 is a stud secured to the rocker-plate and carries a sleeve 122 on which there is a gear 123 meshing with the gear 120. Suitable change-gears are adapted to be selectively placed on said sleeve, which in turn are adapted to be selectively engaged with the respective gears 101 102 103. I have shown these change-gears at 124, and I prefer to arrange them step-like in the box 100 when out of use. These respective change-gears have tongue and groove connection 125 with the sleeve 122 and may be readily taken out of said box in which they are adapted to loosely rest and slipped on and off of said sleeve. A spring 126 backs said sleeve for normally pressing the change-gear on the sleeve axially outwardly for causing it to remain in transverse relation with its mating-sleeve-gear when in mesh therewith. The gear-box 100 has a cover 127 which has a handle 128 and forms a lever acting to clamp the rocker-plate in position. This cover is pivoted on a stud-shaft 129 mounted in bearings 130 on the box. The stud-shaft 129 at its outer end has a screw-extension 131 turning in an internally threaded socket of a clamp 132 which takes outside the outer face of the rocker-plate, the latter having an engaging face 133 for the clamp. To prevent turning of the clamp a pin 134 is provided. The rocker-plate also has a handle 135 for manipulation. The rocker-plate has a positioning-slot 136, the walls of which are adapted to engage a positioning-lug 137 on the box. When now it is desired to change the speed of the lead-screw, the telescoping gears 101 102 103 are so positioned as to permit selective meshing of the selected change-gear therewith. If it is desired that the change-gear shall mesh with the gear 101, the gears 102 103 are pushed inwardly so as to permit the gear 101 only to be in transverse range of the change-gear, or if desired to mesh with the gears 102 103, the selected gear is pushed outwardly by means of its collar for shifting it into transverse plane with the change-gear. The proper change-gear is then placed on the sleeve 122 and the rocker-plate rocked upon its axis for causing mesh between the change-gear and the selective telescoping gear. When proper mesh between said gears has been obtained, the cover 127, which until now has been in raised position, is thrown downwardly, thereby drawing the clamp 132 inwardly and clamping it against the face 133, which clamps the rocker-plate to the gear-box. When the cover is pressed down it also locks the change-gears within the box, thereby preventing loss or displacement of the same.

The shaft 119 is journaled in bearings 138 in the gear-box and carries a gear 139 and a gear 140. The gear 139 meshes with a gear 141 journaled loosely about the lead-screw 142. The lead-screw is journaled in a bearing 143 in the box 100 and in a bearing at the tail end of the lathe-bed. A slip collar 145 slides longitudinally on the lead-screw and has spline-connection 146 therewith. There is a clutch 147 between the gear 141 and slip-collar 145. A gear 148 is on said collar and is adapted to be thrown into or out of mesh with the gear 140. This construction permits the speeds obtained through said change-gears to be multiplied as the slipping collar may be selectively thrown into connection with the gear 141 by means of the clutch or with the gear 140 by causing its teeth to engage with the latter. For determining whether the slipping collar shall make clutch or gear-tooth connection I provide a gage-plate 149 having columns 150 151 of feeds obtained, a flange 152 on the slip-collar being adapted to register with either of said columns.

Having thus fully described my invention what I claim as new and desire to secure by Letters Patent is:

1. In a lathe, the combination of a spindle, a prime mover therefor journaled thereabout, gearing journaled about and slidable longitudinally of said spindle and having driving connection with said prime mover, a rocking gear arranged to selectively mesh therewith, and gearing between said last-named gear and the spindle, the said spindle having driving connection adjacent its inner end with said last-named gearing.

2. In a lathe, the combination of a spindle, a sleeve journaled thereabout, a prime mover secured to said sleeve, gears of different diameters slidable on said sleeve and rotating therewith, a tumbler gear, and a bull-wheel at the inner end of said spindle, said bull-wheel having operative connection with said tumbler-gear.

3. In a lathe, the combination of a spindle, a sleeve journaled about said spindle, a prime mover on said sleeve, sliding gears of different diameters rotatively secured to said sleeve, a tumbler-gear having driving connection with said sliding-gears, a bull wheel, and gearing driven by said tumbler-gear having operative mesh with said bull-wheel.

4. In a lathe, the combination of a spindle, a prime mover journaled thereabout, gearing journaled about said spindle and having rotary connection with said prime mover, a tumbler-gear, gearing driven by said tumbler-gear, and a clutch and plurality of gear-trains between said last-named gearing and the spindle, the said clutch having connection with one of said train-gears and the spindle.

5. In a lathe, the combination of a spindle, a prime mover journaled thereabout adjacent one end thereof, gearing journaled about said spindle and having rotary connection with said prime mover, a tumbler-gear, gearing driven by said tumbler-gear, a clutch and gear connection adjacent the other end of said spindle between said last-named gearing and the spindle, and means for alternately operatively connecting said clutch and last-named gearing.

6. In a lathe, the combination of a spindle, a plurality of sleeves journaled thereabout, means for operatively connecting said sleeves for simultaneous rotation, and a train of gears between said sleeves for driving one of said sleeves from the other at different relative speeds, a clutch interposed between said driven sleeve and the spindle, gearing between said train of gears and the spindle, and means for selectively operatively connecting said clutch and said last-named gearing.

7. In a lathe, the combination of a spindle, sleeves journaled longitudinally of each other about said spindle, said sleeves having driving connection between them for causing simultaneous rotation thereof, means for driving one of said sleeves, a clutch and a train of gears between the other of said sleeves and the spindle, and means for selectively causing operative connection of said clutch and of said last-named train of gears.

8. In a lathe, the combination of a spindle, a plurality of sleeves journaled thereabout longitudinally of each other, driving connection between said sleeves, a slidable sleeve taking about said spindle, driving connection between said last-named sleeve and said first-named plurality of sleeves and releasable driving connection between said slidable sleeve and said spindle.

9. In a lathe, the combination of a spindle, a plurality of sleeves journaled thereabout longitudinally of each other, driving connection between said sleeves, a slidable sleeve taking about said spindle, driving connection between said last-named sleeve and said first-named plurality of sleeves, releasable driving connection between said slidable sleeve and said spindle, said releasable driving connection comprising a clutch and a train of gears, and means for selectively operatively connecting said clutch and train of gears.

10. In a lathe, the combination of a spindle, a plurality of sleeves journaled thereabout longitudinally of each other, said sleeves having driving connection with each other, a slidable sleeve taking about said spindle, said last-named sleeve having driving connection with said first-named plurality of sleeves, said slidable sleeve having releasable driving connection with said spindle, said last-named driving connection comprising a clutch and variable speed gearing, and means for selectively rotatively connecting said clutch and said variable speed gearing.

11. In a lathe, the combination of a spindle, a prime mover journaled about said spindle adjacent the head end thereof, a bull-wheel secured to said spindle at the tail end thereof, a pinion for said bull-wheel, a tumbler-gear for said pinion having coincident rotary axis therewith, a plurality of tumbler-pinions operatively connected with said tumbler-gear, sliding gears journaled about said spindle, and means for selectively causing said respective tumbler-pinions to mesh with said sliding gears.

12. In a lathe, the combination of a spindle, a bull-wheel therefor, a pinion meshing with said bull-wheel, a tumbler-wheel whose pivotal axis is coincident with the rotary axis of said pinion, a tumbler-pinion having operative connection with said tumbler-wheel, gearing journaled about and sliding longitudinally of said spindle, and means for causing selective mesh between said tumbler-pinion and said last-named gearing for driving said pinion at different speeds.

13. In a lathe, the combination of a spindle, a bull-wheel therefor, a pinion meshing with said bull-wheel, a tumbler-wheel whose pivotal axis is coincident with the rotary axis of said pinion, a plurality of tumbler-pinions having operative connection with said tumbler-wheel, gearing journaled about and sliding longitudinally of said spindle, and means for causing mesh between said plurality of tumbler-pinions and said last-named gearing for driving said pinion at different speeds.

14. In a lathe, the combination of a spindle, a bull-wheel therefor, a pinion for driving the bull-wheel, a tumbler whose pivotal axis is coincident with the rotary axis of said pinion, a tumbler-gear, a gear normally loosely rotating about said spindle and meshing with said tumbler-gear, a clutch between said last-named gear and the spindle and means for driving said tumbler-gear at various speeds.

15. In a lathe, the combination of a spindle, a bull-wheel therefor, a pinion for driving the bull-wheel, a tumbler whose pivotal axis is coincident with the rotary axis of said pinion, a tumbler-gear, a gear normally loosely rotating about said spindle and meshing with said tumbler-gear, a clutch between said last-named gear and the spindle, means for driving said tumbler-gear at various speeds, and means connecting with said pinion and clutch for selectively engaging the clutch-faces of said clutch or said pinion with said bull-wheel.

16. In a lathe, the combination of a spindle, a bull-wheel therefor, a pinion for driving the bull-wheel, a tumbler whose pivotal axis is coincident with the rotary axis of said pinion, a tumbler-gear, a gear normally loosely rotating about said spindle and meshing with said tumbler-gear, a clutch between said last-named gear and the spindle, and means for driving said tumbler gear at various speeds.

17. In a lathe, the combination of a spindle, a bull-wheel therefor, a pinion for driving the bull-wheel, a tumbler whose pivotal axis is coincident with the rotary axis of said pinion, a tumbler-gear, a gear normally loosely rotating about said spindle and meshing with said tumbler-gear, a clutch between said last-named gear and the spindle, means for driving said tumbler-gear at various speeds, and means connecting with said pinion and clutch for selectively engaging the clutch-faces of said clutch or said pinion with said bull-wheel.

18. In a lathe, the combination of a spindle, a bull-wheel therefor, a pinion for driving the bull-wheel, a tumbler whose pivotal axis is coincident with the rotary axis of said pinion, a tumbler-gear, a gear normally loosely rotating about said spindle and meshing with said tumbler-gear, a clutch between said last-named gear and the spindle, means for driving said tumbler-gear at various speeds, and means connecting with said pinion and clutch for selectively engaging the clutch-faces of said clutch or said pinion with said bull-wheel, said last-named means comprising a shifting part and a releasable latch.

19. In a lathe, the combination of a spindle, means for driving said spindle at various speeds comprising a clutch having a longitudinally slidable clutch-member and meshing gearing including a longitudinally slidable gear-member, and means for longitudinally moving said slidable members comprising a plurality of shifting parts and a latch having engagement between them.

20. In a lathe, the combination of a spindle, means for driving said spindle at various speeds comprising a clutch having a longitudinally slidable clutch-member and meshing gearing including a longitudinally slidable gear-member, and means for longitudinally moving said slidable members comprising a plurality of shifting parts, a latch between them and means for automatically disengaging said latch.

21. In a lathe, the combination of a spindle, means for driving said spindle at various speeds comprising a clutch having a longitudinally slidable clutch-member and meshing gearing including a longitudinally slidable gear-member, and means for longitudinally moving said slidable members comprising a plurality of shifting parts having spaced contact-faces, and a latch between said shifting parts.

22. In a lathe, the combination of a spindle, means for driving said spindle at various speeds comprising a clutch having a longitudinally slidable clutch-member and meshing gearing including a longitudinally slidable gear-member, and means for longitudinally moving said slidable members comprising a plurality of shifting parts having spaced contact-faces, a latch between said shifting parts, and means automatically releasing said latch.

23. In a lathe, the combination of a spindle, means for driving said spindle at various speeds comprising a clutch having a longitudinally slidable clutch-member and meshing gearing including a longitudinally slidable gear-member, and means for longitudinally moving said slidable members comprising a plurality of shifting parts having spaced contact-faces, and a latch between said shifting parts, the contact face of one of said shifting parts and said latch having relative movement between them during part of said longitudinal movement and simultaneous movement between them during another part of said longitudinal movement.

24. In a lathe, the combination of a spindle, a bull-wheel therefor, a pinion for driving the bull-wheel, a tumbler whose pivotal axis is coincident with the rotary axis of said pinion, a tumbler-gear, a gear normally loosely rotating about said spindle and meshing with said tumbler-gear, a clutch between said last-named gear and the spindle, means for driving said tumbler gear at various speeds, and shifting means connecting with said pinion and clutch for selectively engaging the clutch-faces of said clutch or said pinion with said bull-wheel, said shifting means comprising a shifting-block having connection with said clutch, said shifting-block having a contact-part, a shifting part having contact-parts thereon spaced apart from said first-named contact parts, and a latch with which one of said last-named shifting parts is adapted to engage, substantially as described.

25. In a lathe, the combination of a spindle, a bull-wheel, a tumbler whose pivotal axis is coincident with the rotary axis of said pinion, a tumbler-gear, a gear normally loosely rotating about said spindle and meshing with said tumbler-gear, a clutch between said last-named gear and the spindle, means for driving said tumbler-gear at various speeds, and shifting means connecting with said pinion and clutch for selectively engaging the clutch-faces of said clutch or said pinion with said bull-wheel, said shifting means comprising a shifting-block having connection with said clutch, said shifting-block having a contact-part, a shifting part having contact-parts thereon spaced apart from said first-named contact-part, a latch with which one of said last-named shifting parts is adapted to engage, and means for automatically retracting said latch.

26. In a lathe, the combination of a spindle, a tumbler, and a shaft having a rotary axis coincident with the rocking axis of said tumbler, of trains of gearing between said spindle and shaft, one of said trains comprising a tumbler-gear and a clutch, the other of said trains comprising a laterally shifting gear having driving connection with said tumbler-gear, and a tumbler-lever rockable about its longitudinal axis for shifting said clutch and shifting gear, substantially as described.

27. In a lathe, the combination of a spindle, a bull-wheel therefor, a pinion meshing with said bull-wheel, a tumbler and tumbler-gear, a spindle-gear meshing with said tumber-gear and journaled about said spindle, said spindle having driven connection with said spindle-gear and said pinion, and a tumbler-lever for shifting said driven connection.

28. In a lathe, the combination of a spindle, a tumbler, a tumbler-wheel, a plurality of driving connections between said tumbler-wheel and spindle, a plurality of differently sized gears journaled about said spindle and slidable longitudinally thereof, a pinion on said tumbler having driving connection with said tumbler-gear and opposite which the gears of said plurality of gears are arranged to be selectively placed, and a tumbler-lever moving transversely of said spindle for causing meshing of said tumbler-pinion with selective gears of said plurality of gears, said tumbler-lever being rockable about its axis for operatively connecting said spindle selectively with said first-named plurality of driving connections.

29. In a lathe, the combination of a spindle, a spindle-gear loosely journaled thereabout, a clutch between the latter and said spindle, a bull-wheel on said spindle, a pinion meshing therewith, a tumbler, a tumbler-gear having coincident axis with said pinion and meshing with said spindle-gear, and mechanism coöperating with said spindle-gear or said pinion to selectively drive said spindle from said tumbler gear.

30. In a lathe, the combination of a spindle, an internally and externally toothed tumbler-gear, a pinion having coincident rotary axis therewith, a tumbler, a spindle gear meshing with said externally toothed tumbler-gear, a bull-wheel on said spindle meshing with said pinion, and mechanism coöperating with said spindle-gear or said pinion to selectively drive said spindle from said tumbler gear.

31. In a lathe, the combination of a spindle, a driving sleeve and a driven sleeve loosely journaled thereabout, driving connection between said sleeves for causing simultaneous rotation thereof, a plurality of gears on said driving sleeve, a tumbler, a gear on said tumbler arranged to selectively mesh with said driving gears, a tumbler-gear, a slidable sleeve taking loosely about said spindle and having driving connection with said driven sleeve, a gear thereon in mesh with said tumbler-gear, and a releasable clutch between said last-named gear and spindle.

32. In a lathe, the combination of a spindle, a driving sleeve and a driven sleeve loosely journaled thereabout, driving connection between said sleeves for causing simultaneous rotation thereof, a plurality of different sized gears on said driving sleeve, a tumbler, a gear on said tumbler arranged to selectively mesh with the gears of said nest of gears, a tumbler-gear with which said last-named gear has driving connection, a bull-wheel on said spindle, and a pinion meshing therewith having coincident axis with said tumbler and tumbler-gear.

33. In a lathe, the combination of a spindle, a driving sleeve and a driven sleeve journaled thereabout, a nest of differently sized gears on said driving sleeve, a tumbler, a shiftable gear on said tumbler arranged to selectively mesh with the gears of said nest of gears, a tumbler-gear having driving connection therewith, a spindle-gear normally loosely rotating about said spindle in mesh with said tumbler-gear, a clutch between said spindle and spindle-gear, a bull-wheel on said spindle, a pinion in mesh therewith having coincident axis with said tumbler-gear and tumbler for driving said spindle, and means for interrupting said last-named driving connection and operatively connecting said clutch.

34. In a lathe, the combination of a spindle, a driving sleeve and a driven sleeve loosely rotating thereabout, means for connecting said sleeves for causing simultaneous rotation thereof, a nest of diversely sized gears on said driving sleeve, a tumbler, a shiftable-gear on said tumbler arranged to selectively mesh the gears of said nest of gears, a pinion operated thereby, an internally toothed gear with which said pinion meshes, an externally toothed gear rotating with the latter, a slidable sleeve telescoping and having driving connection with said driven sleeve, a clutch between said slidable sleeve and the spindle, said slidable sleeve having a gear thereon meshing said externally toothed gear, a bull-wheel on the spindle, a pinion meshing therewith having coincident axis with said internally and externally toothed gears and said tumbler, and means for shifting said last-named gear and said clutch.

35. In a lathe, the combination of a spindle, a driving sleeve and a driven sleeve loosely rotating thereabout, means for connecting said sleeves for causing simultaneous rotation thereof, a nest of diversely sized gears on said driving sleeve, a tumbler, a shiftable-gear on said tumbler arranged to selectively mesh the gears of said nest of gears, a pinion rotated thereby, an internally toothed gear with which said pinion meshes, an externally toothed gear rotating with the latter, a slidable sleeve telescoping and having driving connection with said driven sleeve, a clutch between said slidable sleeve and the spindle, said slidable sleeve having a gear thereon meshing said externally toothed gear, a bull-wheel on the spindle, a pinion meshing therewith having coincident axis with said internally and externally toothed gears and said tumbler, and means for shifting said last-named gear and said clutch, said shifting means comprising a tumbler-lever rockable about its axis.

36. In a lathe, the combination of a spindle, a driving sleeve and a driven sleeve loosely rotating thereabout, means for connecting said sleeves for causing simultaneous rotation thereof, a plurality of diversely sized gears on said driving sleeve, a tumbler, a shiftable-gear on said tumbler arranged to selectively mesh the gears of said plurality of gears, a pinion operated thereby, an internally toothed gear with which said pinion meshes, an externally toothed gear rotating with the latter, a slidable sleeve telescoping and having driving connection with said driven sleeve, a clutch between said slidable sleeve and the spindle, said slidable sleeve having a gear thereon meshing said externally toothed gear, a bull-wheel on the spindle, a pinion meshing therewith having coincident axis with said internally and externally toothed gears and said tumbler, and means for shifting said last-named gear and said clutch comprising a shaft for said bull-wheel-pinion, a toothed collar thereon, a pinion on said tumbler-lever engaging with the latter, a shifting-block, said collar and shifting-block having engaging spaced contacts.

37. In a lathe, the combination of a spindle, a driving sleeve and a driven sleeve loosely rotating thereabout, means for connecting said sleeves for causing simultaneous rotation thereof, a plurality of diversely sized gears on said driving sleeve, a tumbler, a shiftable-gear on said tumbler arranged to selectively mesh the gears of said plurality of gears, a pinion operated thereby, an internally toothed gear with which said pinion meshes, an externally toothed gear rotating with the latter, a slidable sleeve telescoping and having driving connection with said driven sleeve, a clutch between said slidable sleeve and the spindle, said slidable sleeve having a gear thereon meshing said externally toothed gear, a bull-wheel on the spindle, a pinion meshing therewith having coincident axis with said internally and externally toothed gears and said tumbler, and means for shifting said last-named gear and said clutch comprising a shaft for said bull-wheel-pinion, a toothed collar thereon, a pinion on said tumbler-lever engaging therewith, a shifting-block having engaging spaced contacts, and a releasable latch on said block engaging one of the contacts on said collar.

38. In a lathe, the combination of a spindle, a bull-wheel at its inner end, a pinion meshing therewith, a shaft therefor, a tumbler pivoted about said shaft, a tumbler-gear on said shaft, a tumbler-pinion in operative engagement with the latter, a plurality of driving gears of different diameters rotating loosely about said spindle, and means for causing operative engagement between said tumbler-pinion and selective ones of said last-named gears.

39. In a lathe, the combination of a spindle, a bull-wheel at its inner end, a pinion meshing therewith, a shaft therefor, a tumbler pivoted about said shaft, a tumbler-gear on said shaft, a plurality of tumbler-pinions in operative engagement with the latter, a plurality of driving gears of different diameters rotating loosely about said spindle, and means for causing operative engagement selectively between said plurality of tumbler-pinions and selective ones of said last-named gears.

40. In a lathe, the combination of a spindle, a group of diversely-sized gears rotatable thereabout, a tumbler and tumbler-gear, a plurality of tumbler-pinions on said tumbler operatively connected with said tumbler-gear and arranged to selectively mesh selective ones of said group of diversely-sized gears, and driving connection between said tumbler-gear and spindle.

41. In a lathe, the combination of a spindle, a bull-wheel at its inner end, a pinion therefor, a shaft for the latter, a tumbler pivoted about said shaft, a tumbler-wheel on said shaft, a tumbler-pinion having operative engagement with said wheel, a plurality of diversely-sized driving gears rotating loosely about said spindle, and means for causing operative engagement between said tumbler-pinion and selective ones of said last-named gears, a spindle-pinion normally rotating loosely about said tumbler-wheel, a clutch between said spindle-pinion and spindle, and means for operating the same.

42. In a lathe, the combination of a spindle, a bull-wheel therefor, a pinion having operative engagement with the latter, a shaft for the pinion, a tumbler pivoted about said shaft, a tumbler-wheel on said shaft, a tumbler-pinion having operative engagement with said tumbler-wheel, a plurality of diversely-sized driving gears rotating loosely about said spindle, means for causing operative connection between said tumbler-pinion and selective ones of said driving gears, a spindle-pinion normally rotating loosely about said spindle and operatively geared to said tumbler-gear, a clutch between said spindle-pinion and spindle, and means for sliding a clutch member and said bull-wheel-pinion longitudinally for causing operative driving connection to said spindle through said clutch or through said bull-wheel-pinion.

43. In a lathe, the combination of a spindle, a bull-wheel therefor, a pinion having operative engagement with the latter, a shaft for the pinion, a tumbler pivoted about said shaft, a tumbler-wheel on said shaft, a tumbler-pinion having operative engagement with said tumbler-wheel, a plurality of different sized driving gears rotating loosely about said spindle, means for causing operative connection between said tumbler-pinion and selective ones of said driving gears, a spindle-pinion normally rotating loosely about said spindle and operatively geared to said tumbler-gear, a clutch between said spindle-pinion and spindle, and means for sliding a clutch-member and said bull-wheel-pinion longitudinally for causing operative driving connection to said spindle through said clutch or through said bull-wheel-pinion, said operating means comprising a tumbler-lever rocking on its longitudinal axis.

44. In a lathe, the combination of a spindle, a bull-wheel therefor, a bull-wheel pinion, a shaft therefor, a tumbler pivoted about said shaft, a tumbler-wheel on said shaft, a tumbler-pinion in operative engagement with the latter, a plurality of different sized driving gears rotating loosely about said spindle, means for causing operative connection between said tumbler-pinion and selective ones of said driving gears, a sleeve rotating loosely about said spindle, a telescoping sleeve taking thereover and splined thereto, a gear on said telescoping gear having driving connection with said tumbler-wheel, a clutch between the latter and the spindle, releasable driving connection between said first-named sleeve and one of said driving gears, and means for selectively causing operative driving connection between the members of said clutch and between said bull-wheel and bull-wheel-pinion.

45. In a lathe, the combination of a spindle, a bull-wheel therefor, a bull-wheel pinion, a tumbler-barrel, internally toothed and externally toothed gears therefor, said last-named gears and the tumbler-barrel and pinion having coincident axis, a shaft journaled in said tumbler-barrel, a pinion meshing with said internally toothed gear and an overhanging pinion on said shaft, a plurality of diversely-sized driving gears rotating loosely about said spindle, means for causing operative engagement between said overhanging pinion and selective ones of said driving gears, a spindle-pinion normally loosely rotating about said spindle and meshing with said externally toothed gear, a clutch between said spindle-pinion and spindle, and means for selectively causing operative connection between the members of said clutch and through said tumbler-shaft to said bull-wheel.

46. In a lathe, the combination of a spindle, a group of diversely-sized gears journaled thereabout, a prime-mover therefor, a tumbler and tumbler-gear, gearing between said tumbler-gear and the spindle for driving said spindle, a pinion-shaft on said tumbler driven from said tumbler-gear, and change-pinions of different diameters adapted to be selectively operatively secured to said pinion-shaft and arranged to selectively mesh said group of diversely-sized gears.

47. In a lathe, the combination of a spindle, a group of diversely-sized gears journaled thereabout, a prime-mover therefor, a tumbler and tumbler-gears, pinion-shafts on said tumbler having driving connection with said tumbler-gears, gearing between said pinion-shafts and said spindle for driving said spindle, and change-pinions of different diameters adapted to be selectively secured to said pinion-shafts and arranged to selectively mesh said group of diversely-sized gears.

48. In a lathe, the combination with a spindle and speed changing mechanism therefor, of a speed changing guide comprising an index-member and an indicator-member therefor, said index-member comprising a column of desirable circumferential speeds and columns of speed changing mechanism connections for approximately attaining said speeds, and an operative connection between a member of said speed changing guide and said speed changing mechanism for causing positioning in the latter corresponding to the relative position between the members of said guide.

49. In a lathe, the combination with a spindle and speed changing mechanism therefor, of a speed changing guide comprising an index-member and an indicator-member therefor, said index-member comprising a column of desirable circumferential speeds and columns of gearing for approximately attaining said speeds, one of said members having operative connection with a part or parts of said speed changing mechanism for causing positioning of said part or parts therein to correspond with the relative position between said members of said guide.

50. In a lathe, the combination with a spindle and speed changing mechanism therefor, of a speed changing guide embracing an index member comprising a column of desirable circumferential speeds and primary columns of work diameters arranged into secondary columns of work diameters for given speeds and an indicator-member for said columns, and an operative connection between a member of said speed changing guide and a part of said speed changing mechanism for positioning said part of said speed changing mechanism to correspond to the relative positioning of said members of said guide.

51. In a lathe, the combination with a spindle and speed changing mechanism therefor, of a speed changing guide comprising an index-member and an indicator-member, said index-member comprising a column of desirable circumferential speeds and primary columns of work diameters and speed changing mechanism connections therefor arranged into secondary columns of work diameters and speed changing mechanism connections for said respective speeds, and an operative connection between a member of said speed changing guide and a part of said speed changing mechanism for positioning said part of said speed changing mechanism by the relative position between said members.

52. In a lathe, the combination with a spindle and speed changing mechanism therefor, of a speed changing guide comprising an index-member and an indicator-member, an operative connection between a member of said speed changing guide and a part of said speed changing mechanism for determining the position of the latter, said index-member comprising a column of desirable circumferential speeds and primary columns of work diameters arranged into secondary columns of work diameters for given speeds, and shifting means for said operative connection, substantially as described.

53. In a lathe, the combination with a spindle and speed changing mechanism therefor, of a speed changing guide comprising an index-member and an indicator-member therefor, said index-member comprising a column of desirable circumferential speeds and columns of work diameters therefor arranged into secondary columns of work diameters for each given speed, and a shifter having connection with a member of said speed changing guide and a part of said speed changing mechanism for simultaneously shifting said member and part, substantially as described.

54. In a lathe the combination with a spindle and speed changing mechanism therefor, of a speed changing guide comprising a rotatable member and an indicator-member therefor, said rotatable member having a peripheral index comprising columns of desired circumferential speeds and work diameters, and operative connection between a member of said speed-changing guide and a part of said speed-changing mechanism, and constructed and arranged for positioning said part of said speed-changing mechanism through said operative connection to correspond with the relative position between said index-member and indicator-member.

55. In a lathe, the combination with a spindle and speed changing mechanism therefor, of a speed changing guide comprising a rotatable member and an indicator-member, said rotatable member having a peripheral index comprising a column of circumferential speeds and columns of gears for approximately attaining said speeds, one of said members having operative connection with a part of said speed changing mechanism for causing relative positioning in the latter to correspond to the relative positioning between said members.

56. In a lathe, the combination with a spindle and speed changing mechanism therefor, of a speed changing guide comprising an index-member and an indicator-member therefor, said index-member comprising longitudinal columns of desirable circumferential speeds and connections for approximately attaining said speeds and transverse columns indicating a desirable circumferential speed and connections for approximately attaining said speed, an operative connection between a member of said speed changing guide and a member of said speed changing mechanism for causing positioning in the latter according to the relative position between said members, substantially as described.

57. In combination, in a lathe, a support, a spindle and a speed-barrel journaled therein, a plurality of meshing gears having coincident rotary axis with each of the latter respectively, a pinion eccentrically mounted on the speed-barrel in train with the gear on said barrel, and a gear taking about the spindle with which said pinion is adapted to mesh, and means for rocking said speed-barrel.

58. In combination, in a lathe, a support, a spindle and a speed-barrel journaled therein, a plurality of meshing gears having coincident rotary axis with each of the latter respectively, a pinion mounted eccentrically on the speed-barrel in train with the gear on said barrel, a gear taking about the spindle with which said pinion is adapted to mesh, and a shaft journaled in the speed-barrel and movable at right angles to the spindle for rocking the speed barrel and rockable about its longitudinal axis for shifting a speed-barrel gear.

59. In combination, in a lathe, a support, a spindle and a speed-barrel journaled therein, a plurality of meshing gears at the tail end of the support having coincident rotary axis with each of the latter respectively, a plurality of driving gears loosely journaled about the spindle and slidable longitudinally thereof, a pinion mounted eccentrically on the speed-barrel in train with the gear on said barrel adapted to selectively mesh with said slidable gears, said barrel having a recess at its head and adapted to receive said gears, substantially as described.

60. In a lathe, the combination with the spindle, a bull-wheel therefor, a spindle-wheel normally loosely rotating about the spindle, a clutch between said spindle-wheel and spindle, said spindle-wheel and clutch and bull-wheel being closely adjacent each other at the inner end of the spindle, a prime mover adjacent the outer end of the spindle, a pinion for the bull-wheel, a tumbler and tumbler-wheel having coincident axis with said pinion, said tumbler-wheel meshing with said spindle-pinion, a nest of diversely-sized gears journaled loosely with said prime mover about said spindle, a tumbler-pinion operatively connected with said tumbler-wheel and selectively meshing selective ones of said nest of gears for imparting various speeds to said spindle, a driven shaft, a nest of telescoping gears between said driven shaft and spindle, a tumbler-plate with gear and pinion therefor, change-gears selectively connected with said pinion and selectively meshing selective ones of said nest of telescoping gears, and driving means between said nest of telescoping gears and said spindle and between said tumbler-gear and the driven shaft.

61. In a lathe, a spindle supported in bearings near its opposite ends, a prime mover loosely journaled on said spindle intermediate of its bearings, a bull-wheel rigidly connected to said spindle outside of one of said spindle bearings and provided with means to detachably support a driven member, and gear mechanism interposed between said prime mover and said bull-wheel to transmit motion from said prime mover to said bull-wheel.

62. In a lathe a spindle, a prime mover loosely journaled upon said spindle intermediate of the spindle bearings, mechanism located intermediate of the spindle bearings to be selectively employed to clutch said prime mover directly to said spindle, a bull-wheel rigidly connected to said spindle outside of one of the spindle bearings, and a train of gearing adapted to be selectively employed to transmit motion from said prime mover to said bull-wheel.

63. In a lathe, a spindle supported in bearings near its opposite ends, a prime mover loosely mounted upon said spindle intermediate of said spindle bearings, means carried by said spindle intermediate of its bearings adapted to be selectively employed to clutch said prime mover to said spindle to drive said spindle at the same speed as said prime mover, a bull-wheel rigidly connected to said spindle outside of one of said spindle bearings in position to support a driven member, and gear mechanism adapted to be selectively employed to transmit motion from said prime mover to said bull-wheel at a relatively different speed from that of said prime mover.

64. In a lathe, a spindle supported in bearings near its opposite ends, said spindle being externally cylindrical outside of one of its bearings and provided with an external flange intermediate of said bearing and the end of the spindle, a bull-wheel rigidly connected to said external flange and having an internally threaded hub overhanging a portion of the outer end of said spindle to detachably engage a driven member, a prime mover loosely journaled on said spindle intermediate of said spindle bearings, and gear mechanism receiving motion from said prime mover and adapted to drive said bull-wheel.

65. In a lathe, a spindle supported in bearings near its opposite ends, said spindle being externally cylindrical outside of one of its bearings and provided with an external flange intermediate of said bearing and the end of the spindle, a bull-wheel rigidly connected to said external flange and provided with an internally threaded hub overhanging a portion of the cylindrical end of said spindle to detachably engage a driven member, a prime mover loosely journaled on said spindle intermediate of the spindle bearings, mechanism adapted to clutch said prime mover to said spindle, and to be selectively employed, and gear mechanism adapted to be selectively employed and to transmit motion from said prime mover to said bull-wheel.

66. In a lathe, a spindle supported in bearings near its opposite ends, said spindle being cylindrical outside of one of its bearings, a bull-wheel rigidly connected to said spindle intermediate of the end of the spindle and said bearing and seated in a housing recess in said bearing, means carried by said bull-wheel to detachably support a driven member, a prime mover loosely journaled on said spindle intermediate of the spindle bearings, and gear mechanism adapted to transmit motion from said prime mover to said bull-wheel.

67. In a lathe, a spindle supported in bearings near its opposite ends, said spindle being provided outside of one of its bearings with a bull-wheel rigidly connected to the spindle intermediate of the end of the spindle and one of the spindle bearings and outside of said bearing, and seated in a housing recess in said spindle bearing, means carried by said bull-wheel to detachably support a driven member, a prime mover loosely journaled on said spindle, clutch mechanism carried by said spindle intermediate of the spindle bearings adapted to be shifted into and out of operative position, and when in operative position to clutch said prime mover to said spindle, and gear mechanism adapted to be shifted into and out of operative position, and when in operative position to transmit motion from said prime mover to said bull-wheel.

In testimony whereof, I have subscribed my name hereto in the presence of two subscribing witnesses.

WILLIAM L. SCHELLENBACH.

Witnesses:
C. W. MILLS,
W. THORNTON BOGERT.